(12) United States Patent
Boersma et al.

(10) Patent No.: US 7,678,187 B2
(45) Date of Patent: Mar. 16, 2010

(54) COMPOSITIONS COMPRISING A (POLY)AMINE AND A CARBOXYLATED CARBOHYDRATE

(75) Inventors: Arjen Boersma, 's-Hertogenbosch (NL); Theodoor M. Slaghek, Rotterdam (NL); Jan J. de Vlieger, Eindhoven (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 541 days.

(21) Appl. No.: 10/590,023

(22) PCT Filed: Feb. 14, 2005

(86) PCT No.: PCT/NL2005/000105

§ 371 (c)(1),
(2), (4) Date: Apr. 26, 2007

(87) PCT Pub. No.: WO2005/080499

PCT Pub. Date: Sep. 1, 2005

(65) Prior Publication Data

US 2007/0270608 A1    Nov. 22, 2007

(30) Foreign Application Priority Data

Feb. 19, 2004 (EP) .................. 04075544

(51) Int. Cl.
*C08B 31/18* (2006.01)
*C08L 3/10* (2006.01)

(52) U.S. Cl. .............. 106/217.6; 106/31.24; 106/31.68; 106/31.94; 106/162.1; 106/205.6; 106/207.4; 106/214.1; 162/175; 8/115.6; 8/495

(58) Field of Classification Search .............. 106/207.4, 106/214.1

See application file for complete search history.

(56) References Cited

U.S. PATENT DOCUMENTS

| | | | |
|---|---|---|---|
| 3,524,827 A * | 8/1970 | Kryger et al. .................. 524/51 |
| 6,716,976 B1 | 4/2004 | Jetten et al. |
| 6,746,542 B1 | 6/2004 | Lorencak et al. |
| 2002/0098317 A1 | 7/2002 | Jaschinski et al. |
| 2003/0150573 A1 | 8/2003 | Anderson et al. |

FOREIGN PATENT DOCUMENTS

| WO | WO 00/60167 A | 10/2000 |
|---|---|---|
| WO | WO 03/020818 | 3/2003 |

* cited by examiner

*Primary Examiner*—Brian J Davis
(74) *Attorney, Agent, or Firm*—Nixon & Vanderhye P.C.

(57) ABSTRACT

The invention provides a composition comprising an aqueous solution of 0.1-20 wt. % of a poly(amine) and 0.1 to 50 wt. % of a carboxylated carbohydrate having an average molecular weight of at least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine).

19 Claims, No Drawings

COMPOSITIONS COMPRISING A (POLY)AMINE AND A CARBOXYLATED CARBOHYDRATE

This application is the US national phase of International application PCT/NL2005/000105 filed Feb. 14, 2005, which designated the U.S. and claims priority of EP 04075544.9, filed Feb. 19, 2004, the entire contents of each of which are hereby incorporated by reference.

The present invention relates to a composition comprising a (poly)amine and a particular carboxylated carbohydrate, the use of such a composition in the preparation of fibres or paper products, and the use of such composition as coatings, inks and adhesives.

Binders for water-borne coatings are at present mainly based on acrylates. Although the performance of acrylates is usually satisfactory, its dependence on non-annually renewable crude oil sources is a drawback. Thus, there is a need for water-borne binders, thickeners and rheology modifiers based on renewable and inexpensive raw materials.

One object of the present invention is to provide a cost-effective composition which can very attractively be used as a binder, thickener or rheology modifier in coating compositions.

Surprisingly, it has now been found that compositions comprising a (poly)amine and a carboxylated carbohydrate with a (relatively) high degree of carboxyl substitution can attractively be used in coating compositions, because they have a high dry matter content and excellent binding and film-forming properties. In addition, they are resistant to water, resistant to microbial degradation, and are cheap to produce.

Accordingly, the present invention relates to a composition comprising an aqueous solution of 0.1-20 wt. % of a poly (amine) and 0.1-50 wt. % of a carboxylated carbohydrate having an average molecular weight of a least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine).

The carboxylated carbohydrates have a total degree of carboxyl substitution of at least 5%, i.e. at least 5 carboxyl groups are present on 100 anhydroglycose units (AGU) of the carbohydrate. For use as a binder, thickener or rheology modifier in coating compositions, the composition according to the present invention suitably comprises a carboxylated carbohydrate having a degree of carboxylation substitution in the range of from 10-100%, preferably in the range of from 15 to 70%, and more preferably in the range of from 20 to 60%.

The carboxylated carbohydrate can be any carboxylated carbohydrate that is partly or fully soluble in water. Water-soluble compounds are understood herein to comprise compounds that can be dissolved in water at a minimum level of 15% by weight, if necessary after heating or thorough mixing. Suitable examples of carboxylated carbohydrates include glucans, especially α-glucans, in which the anhydroglucose units are linked through 1,3-, 1,4- and/or 1,6-linkages. These glucans include starch, starch components or starch variants such as native starch from any biological source including potato, manioc, tapioca, wheat, maize, rice, banana, quinoa and the like, as well as from genetically modified plants and micro organisms, and starch fractions, amylose, amylopectin, high-amylose starch etc. They also include other branched and non-branched 1,3-, 1,4- and 1,6-glucans (beta-glucans), whether from plant or from microbial origin, such as those described in U.S. Pat. Nos. 6,486,314, 6,465,203 and WO 03/008618. Other carboxylated carbohydrates having the required molecular weight and solubility, such as glucomannans, galactomannans, xyloglucans etc. can also be used in the compositions according to the present invention.

The carboxylated carbohydrate may comprise both carboxyl and aldehyde groups, although aldehyde groups are as such not required in the composition according to the present invention. The carboxyl groups favour water-solubility, while the aldehyde groups introduce functionality, especially crosslinking functionality. Suitably, the carboxylated carbohydrate has a degree of aldehyde substitution in the range of from 0.1 to 20%, i.e. between 0.1 and 20 aldehyde groups are present on 100 anhydroglycose units of the carbohydrate. For use as a binder, thickener or rheology modifier in coating compositions, the carboxylated carbohydrate has preferably a degree of aldehyde substitution in the range of from 0.5 to 10%.

It is preferred that most or all of the carboxyl groups and aldehyde groups are present as the result of oxidation of the carbohydrate. This means that the carbon atoms of the carboxyl and aldehyde groups were already part of the original carbohydrate that was subjected to the oxidation treatment. The presence of carboxyl groups and aldehyde groups can also be expressed by the degree of oxidation. The degree of oxidation (in %) as used herein means the number of anhydroglycose units (AGU) oxidised to units carrying carboxyl and/or aldehyde groups per 100 anhydroglycose unit. As an example, for C6-oxidised starch, a degree of oxidation of 50 means that 50 out of 100 AGU have been oxidised to units carrying C6-carboxyl (glucuronic acid) groups or C6-aldehyde (glucuraldehyde) groups.

In addition to carboxyl and aldehyde groups, other functional groups such as ammonium groups, hydroxyalkyl groups, carboxyalkyl groups, phosphate groups and/or, sulphate groups, may be present in the carboxylated carbohydrate. Carboxyalkyl groups, such as carboxymethyl groups may account for part of the carboxyl groups present. Carboxymethyl groups are obtainable by reaction of the carbohydrate with chloroacetate as commonly known.

Suitably, at least part of the carboxyl groups present in the carboxylated carbohydrate are obtained by carboxyalkylation of the original carbohydrate. In other words, carboxyalkyl groups, in particular carboxymethyl groups may account for part or all of the carboxyl groups present.

The carboxylated carbohydrate may be one single type of carboxylated carbohydrate, but also mixtures of two or more different types of carboxylated carbohydrates may be used. For example, a mixture of C6-carboxyl starch and dialdehyde starch can be used, when the average degree of oxidation is as defined above.

The oxidation treatment of the original carbohydrate can be carried out in a manner known per se. The oxidation treatment should, however, normally proceed in such a manner that chain degradation is minimised, in order to obtain oxidised products of sufficient chain length (molecular weight). A route towards carboxyl and aldehyde functionalisation of carbohydrates consists of oxidation of primary hydroxyl groups (C6 in the starch AGU's). This oxidation is preferably performed with nitroxyl (TEMPO) mediation using various oxidising agents such as hypo halite or peracids or oxygen enzyme-catalysed or metal-catalysed oxidations. These oxidations are disclosed inter alia in NL9301172, U.S. Pat. No. 3,364,200, WO 95/07303, WO 00/50462, WO 00/50463, WO 01/34657 and WO 01/00681. These oxidations result in the presence of both carboxyl and aldehyde groups, the relative amounts of which can be controlled by controlling the reaction conditions or the particular TEMPO derivative. Generally, the ratio of aldehyde to carboxyl ranges from roughly 1:1 at the early stages of oxidation (degree of oxidation up to, say, 20%) to a few percent aldehyde at full (100%) oxidation.

The carboxylated carbohydrate obtained from the oxidation treatment is subsequently subjected to a reduction treatment wherein the carbohydrate is contacted with a reducing agent. In this way at least part of the C6-aldehyde groups can be reduced to hydroxymethyl groups, resulting in a desired content of aldehyde groups. Preferably, the carboxylated carbohydrate obtained after the oxidation treatment is purified before it is contacted with the reducing agent. This can suitably be done by precipitation in a water/ethanol mixture. As the reducing agent any reducing agent can be used which is able to reduce C6-aldehyde groups. Preferably a reducing agent is used comprising a borohydride (anion), such as sodium borohydride or lithium borohydride, more preferably use is made of sodium borohydride. The carboxylated carbohydrate obtained comprises at least part of the reducing agent used in the reduction treatment and/or part of its reaction product(s), whereby the carboxylated carbohydrate forms a complex with the poly(amine). Chemical groups that are derived from the reducing agent, and that are attached to the carbohydrate formed during the reduction of the aldehyde groups, form complexes with the amino groups of the poly (amine). Such chemical groups can be ester groups or ether groups. In case a borohydride is used as the reducing agent, the chemical groups will be borate ester groups. It has surprisingly been found that in the absence of such chemical groups no aqueous solutions are formed when a (poly)amine and a carboxylated carbohydrate are mixed in water, but that instead a precipitate is immediately formed which cannot be used in the various applications of the present invention, although this may be of some value in other applications. Suitably, the carbohydrate comprises more than 20% of the reducing agent and/or its reaction product(s), preferably more than 50%, and more preferably the carbohydrate comprises substantially all of the reducing agent used in the reduction treatment and/or its reaction product(s). The reduction treatment of the oxidised carbohydrate can be carried out in a manner known per se. Reference can in this respect for instance be made to Solomons Organic Chemistry An alternative method of introducing the borate esters is introducing the reducing agent to already carboxylated carbohydrate that may or may not contain any aldehyde groups, such as alginic acid, alginates and the like.

The oxidation and reduction treatments are preferably carried out in a homogeneous medium, wherein the homogeneous medium may be a clear solution or a fine dispersion. Thus, in case of C6-oxidation of starch, the oxidation and reduction treatments are preferably carried out after dissolution, including gelatinisation, of the starch granules. After the reduction treatment the carbohydrate obtained can be isolated by precipitation and/or filtration. Alternatively, the reaction medium can be purified and the resulting carboxylated carbohydrate solution can be mixed with a (poly)amine to obtain the composition of the present invention.

The concentration of the carboxylated carbohydrate in the present compositions is in the range of from 0.1 to 50 wt. %. When used as a binder for coatings, inks and adhesives, in particular coatings, the concentration of the carboxylated carbohydrates is preferably in the range of from 20 to 45 wt. %, more preferably in the range of from 30 to 40 wt. %, whereas the concentration of the (poly)amine is in the range of from 1 to 20 wt. %, more preferably in the range of from 5 to 15 wt. %. For such applications the carboxylated carbohydrate has preferably a degree of carboxyl substitution in the range of from 20-100%, more preferably in the range of from 30 to 95%, whereas the degree of aldehyde substitution is in the range of from 0.1 to 20%, more preferably in the range of from 0.5 to 10%

The carboxylated carbohydrates used in accordance with the present invention are largely based on C6-oxidation. Suitably, at least 75% of the oxidised hydroxyl groups are C6-carboxyl or C6-aldehyde groups, and more preferably 85 to 100% of these the oxidised hydroxyl groups are C6-carboxyl or C6-aldehyde groups.

The composition according to the present invention can be prepared in various ways. A solution or a dispersion of the carboxylated carbohydrate can be added to a solution comprising the (poly)amine. Alternatively, (poly)amine can be added to a solution of the carboxylated carbohydrate, or both can be added to an aqueous solution. Preferably, the composition is prepared by adding the polyamine to the carboxylated carbohydrate solution. If after the reduction treatment the carboxylated carbohydrate obtained is recovered as a solid material, a solution of the carboxylated carbohydrate can be produced by simply adding the required amount of water and mixing. Products that are more difficult to dissolve can be added to warm water in small portions, which initially results in an increased viscosity, which gradually decreases again, to give the desired composition. To the solution of the carboxylated carbohydrate a (poly)amine can then be added.

In a suitable embodiment of the present invention, the carboxylated carbohydrates are crosslinked before, during or after the oxidation treatment and/or reduction treatment. Crosslinkers to be used in accordance with the present invention include isocyanates, epoxides and water-soluble reagents, such as complex forming agents like zinc and zirconium ions, (poly) carbodiimides, (poly)oxazolines, (poly) aziridines and (poly)hydrazides. The concentrations of these crosslinkers can vary from 0.1 to 20 wt. %, more preferably from 0.5 to 10 wt. %, most preferably from 1 to 7 wt. %, based on dry weight carbohydrate. The crosslinkers can be added after preparation of the carbohydrate (starch) solution.

The average molecular weight of the carboxylated carbohydrate is at least about 100,000 D (corresponding to a degree of polymerisation, DP, of about 600). Preferably, the average molecular weight is above 200,000 D, more preferably in the range of from 400,000 to 2,000,000 D (DP from about 2500 to about 12500).

The composition according to the present invention comprises a (poly)amine. A mixture of two or more (poly)amines may be used, although in practice usually the use of one type of (poly)amine will be preferred. Suitable (poly)amine include chitosan, polylysine, polyethylenimine, poly(N-vinyl-N-methyl amine), polyaminostyrene and polyvinylamines. Preferably, the (poly)amine comprises a polyvinyl amine. In general any suitable polyvinyl amine may be used in the present invention. The polyvinyl amine can be a homopolomer or a copolymer. The copolymers may comprise both polyvinylamine and polyvinylformamide such as those described for instance in U.S. Pat. Nos. 4,880,497 and 4,978,427. Also copolymers of polyvinylamine and other groups such as vinylacetate, vinyl propionate or polyvinylalcohol. Suitable examples of such copolymers have been U.S. Pat. Nos. 4,255,548; 4,421,602; 5,961,782 and 2,721,140.

The compositions thus obtained can be used as binders in coatings (such as primers, paints, varnishes, lacquers, anti-graffiti coatings, and the like); adhesives and inks (for e.g. paper, cardboard, wood, walls and wallpaper applications); processing agents; rheology modifiers for use in coatings, adhesives and inks; and sizing agents. The compositions can be concentrated or diluted depending on the application desired. They can be used alone or in combination with other components having the same or other functions, such as plasticisers, tackifiers, crosslinkers, pigments, fillers, surface-active agents and stabilisers. The properties of the carboxylated carbohydrates in dissolved or dry form can be adjusted by varying the oxidation treatment and reduction treatment, the degree of oxidation, the degree of reduction and the molecular weight. In addition, further additives such as plasticisers can modify the performance. Plasticisers, such as polyols and urea, may be present at a level of e.g. 0-60%, especially 10-40% with respect to the carboxylated carbohydrate. The Theological properties of the solutions can be adjusted by the presence of additives.

Coatings of the carboxylated carbohydrate can be prepared by applying the composition according to the present invention to a substrate by means of casting, painting or spraying. The drying time for such carbohydrate coatings typically ranges between 1 and 2 hours. The drying time can be increased by e.g. the addition of a volatile alcohol, such as methanol or ethanol. If desired, the coatings can be crosslinked by means of a water-soluble crosslinker. When a water-soluble crosslinker is used, the first part of the coating formation is similar to the non-cross linked system. In the latter part of the coating formation, the amount of water in the coating is lowered and/or the pH of the coating is lowered by means of an evaporating base, which results in a homogeneous transparent coating. In the case of a two-component system, the crosslinker is mixed with the present composition and cast, sprayed or painted immediately. The crosslinking reaction starts immediately and/or is accelerated by means of a temperature rise.

The mechanical properties of the coatings prepared from the present compositions the coatings can vary from very hard (hardness 200 MPa, E-modulus 8 MPa) to very rubbery (hardness 10 MPa, E-modulus 0.1 GPa), depending on the level of plasticiser. The oxygen barrier properties are excellent (<0.3 $cm^3.mm/atm/day/m^2$). The adhesive properties are good: adhesive strength>6 MPa.

The present invention also relates to the use of any of the present compositions as a binder in a coating, ink or adhesive. The present composition is especially useful as a binder in a coating.

The composition in accordance with the present invention can also very attractive be used as a paper product additive. It has surprisingly been found that the composition according to the present invention improves the strength properties of paper products considerably. In this respect it has been observed that the addition of the present composition to a paper can make the paper no less than four times stronger in terms of both dry and wet tensile strength. It is believed that this is the result of an improved binding between the starch component and cellulose fibres in the paper product. This finding is most advantageous since it reduced the waste of starch in paper production considerably. In this respect it is observed that in conventional paper production processes much of the starch used ends up in wastewater because of the poor binding between the starch and the cellulose fibres.

The present invention relates therefore also to the use of any of the compositions according to the present invention as a paper product additive.

When used as a paper product additive, the concentration of the carboxylated carbohydrates is preferably in the range of from 0.1 to 20 wt %, more preferably in the range of from 1 to 10 wt. %, whereas the concentration of the (poly)amine is in the range of from 0.1 to 10 wt. %, more preferably in the range of from 1 to 5 wt. %. For such applications the carboxylated carbohydrate has preferably a degree of carboxyl substitution in the range of from 20-100%, more preferably in the range of from 30 to 95%, whereas the degree of aldehyde substitution is in the range of from 0.1 to 20%, more preferably in the range of from 0.5 to 10%.

The present composition according to the present invention can be applied as an additive at various stages of the paper making process. Preferably, the present composition is added to the pulp.

The paper products that benefit from the use of the composition of the present invention include all kinds of cellulose fibrous webs such as tissues, wipers, paper towels, printing paper, writing paper, newspapers, cardboard etc.

It has further been found that fibres can readily be prepared from the present compositions, which finding is surprising since conventionally it has been very difficult, if not impossible, to prepare fibres from starch solutions. Additionally, the fibres thus obtained have surprisingly good properties in terms of stiffness, tensile strength, biodegradability, and transparency. The fibres can be prepared from the composition of the present invention by means of known techniques. Such techniques include for instance pressing the composition through a nozzle with small holes and drawing the material so obtained into fibres, whereafter the fibres can be collected on a rotating tube. Such techniques also include electrospinning, where the composition is pressed through an orifice and elongated in an electric field. The fibres thus obtained comprise a (poly)amine and a carboxylated carbohydrate having an average molecular weight of at least 100,000 D and a degree of carboxyl substitution of at least 5%. The fibres can suitably comprise any of the carboxylated hydrocarbonates and (poly)amines described hereinbefore.

The present invention also relates to fibres made from any of the compositions according to the present invention. Such fibres can suitably be used in a variety of compositions, including paper products, adsorption materials, filter materials and non-wovens. The fibres are especially useful in paper products.

When used for the preparation of fibres, the concentration of the carboxylated carbohydrates in the composition according to the present invention is preferably in the range of from 20 to 40 wt. %, more preferably in the range of from 30 to 40 wt. %, whereas the concentration of the (poly)amine is in the range of from 1 to 20 wt. %, more preferably in the range of from 5 to 10 wt. %. For such applications the carboxylated carbohydrate has preferably a degree of carboxyl substitution in the range of from 20-100%, more preferably in the range of from 30 to 50%, whereas the degree of aldehyde substitution is in the range of from 0.1 to 20%, more preferably in the range of from 0.5 to 10%.

The compositions according to the present invention display in addition the very interesting properties of being soluble in salt solutions such as seawater and urine, and being insoluble in freshwater. Hence, the present invention also relates to the use of the composition according to the present invention for the preparation of a product such as a fibrous product, film, coating, foil, capsule or the like.

EXAMPLES

Example 1

Preparation of the Oxidised Starch

Potato starch (1.28 mol) was gelatinised and 1 gram NaBr (0.01 mol) and TEMPO (0.006 mol) were added. The solution was cooled in an ice-bath and a solution of hypochlorite was brought to pH 10. The reaction was started by adding the hypochlorite solution (0.383 mol). The temperature was below 5° C during the reaction and the pH was maintained at 10 by adding 2M NaOH through automatic titration. When the reaction was finished, excess hypochlorite was quenched with ethanol and the pH was brought to 8 by adding 4M HCl. The unreacted aldehydes were reduced with sodium borohydride. The solution was subsequently brought to pH 5 and the product was desalted and freeze-dried.

Example 2

Removing Reducing Agent (=Stripped)

A part of the solution as was obtained in Example 1 after the reduction with sodium borohydride was brought to pH 3 with 4M HCl in order to remove borate-carbohydrate complexes. The solution was subsequently brought to pH 5 and the product was desalted and freeze-dried. Analysis shows that 32% of the primary alcohols were converted to carboxyl groups. After drying, the moisture content was 3.6%. The average molecular weight of the modified starch was around 400 kD.

Example 3

Mixing Polyvinylamine with Non-Stripped Starch Composition and Visual Observations The dried modified starch (5.0 g) from Example 1 was mixed with 7.1 g water. After thorough mixing at room temperature, a starch solution was obtained having a solid content of 40 wt. % and a viscosity of 1-2 Pas. 5.0 g of a commercial polyvinylamine solution (Basocoll PR 8092) was added slowly and thoroughly mixed. The viscosity of this solution increased with respect to both the starch as well as the polyvinylamine solution and a clear liquid was obtained.

Example 4

Mixing Polyvinylainine with Stripped Starch Composition and Visual Observations

The dried modified starch (5.0 g) from Example 2 was mixed with 7.1 g water. After thorough mixing at room temperature, a starch solution was obtained having a solid content of 40 wt. % and a viscosity of 1-2 Pas. 5.0 g of a commercial polyvinylamine solution (Basocoll PR 8092) was added slowly and thoroughly mixed. It was noticed that a white sediment was formed almost instantaneously upon adding the polyvinylamine solution. A turbid liquid was obtained.

Example 5

Behaviour in Salt/Fresh Water

A small amount of the starch-polyamine composition of Example 3 was poured into fresh water and a white sediment was formed. The starch-polyvinylamine composition is apparently insoluble in fresh water. When a small amount of NaCl is added to the mixture, the white sediment dissolves. This behaviour can also be seen when a thin film is cast on a glass plate from the same composition and immersed in fresh water. A white film is formed almost immediately after immersion in the fresh water.

Example 6

Drawing Fibres

A modified starch according to the present invention having a degree of oxidation of 29% and an average molecular weight of 1700 kD was dissolved in water of 70° C. to a concentration of 38 w %. A commercial polyvinylamine solution (Basocoll PR 8086) was added, so that the resulting solution contained 21% by weight of the non-stripped oxidised starch and 5% by weight of the polyvinylamine. This solution also contained the residual borate-carbohydrate complexes and the salt that was present in the polyvinylamine solution. The resulting solution was a high viscous, elastic liquid. This liquid was pressed through a 1 mm nozzle at 70° C. and the resulting fibre could be drawn into a fibre of ca. 50-100 µm that stiffened upon cooling. This means that an elongation rate of 10 to 20 could be reached. The starch fibre was collected on a rotating tube. The mechanical properties of the fibres after drying are: tensile modulus is 1 GPa and tensile strength 15 MPa. When the fibres are desalted by leading them through a fresh water bath, the mechanical properties of the dried fibres improve significantly to 3.5 GPa (tensile modulus) and 25 MPa (tensile strength).

Example 7

Electrospinniing of Fibres

A modified starch according to the present invention having a degree of oxidation of 94% and an average molecular weight of 500 kD was dissolved in water at room temperature to a concentration of 30% by weight. Sorbitol was added as a plasticiser. A commercial polyvinylamine solution (Basocoll PR 8086) was added, so that the resulting solution contained 20% by weight of the non-stripped oxidised starch, 6% by weight of the plasticiser and 5% by weight of the polyvinylamine. This solution also contained the residual borate-carbohydrate complexes and the salt that was present in the polyvinylamine solution. The resulting solution was a moderate viscous elastic liquid. This liquid was pressed through a thin nozzle of 200 µm and an electric DC field (ca. 20 kV/m) was applied between the nozzle and the metallic substrate. The electric field caused the liquid jet to elongate and fibres were obtained having diameters between 10 and 20 µm. These fibres were collected as a non-woven fabric.

Example 8

Glossy Paper Coatings

The starch-polyamine composition as described in example 3 was applied to a piece of cardboard by casting. After drying, the coating became smooth and glossy. The cardboard became more water-resistant. A droplet of water that was put on the non-treated surface penetrates very fast into the cardboard, whereas a droplet placed on the glossy coating remained a droplet and no indication of water penetration into the cardboard could be detected. When the salts present in the coating are removed by washing the coating with fresh water, the dried coating becomes very hard and scratch resistant.

Example 9

Additive for Papermaking

Small pieces of filter paper were brought into water and a slurry was made containing approximately 4% by weight of cellulose fibres. These cellulose slurries are mixed with pure polyvinylamine (Basocoll PR 8086, 17% by weight), pure oxidised starch (degree of oxidation 29%, average molecular weight 1700 kD, non-stripped, 25% by weight) and a mixture of polyvinylamine (13% by weight) and oxidised starch (20%). The tensile strengths of the four specimens after drying at 23° C. and 50% RH are listed in table 1.

TABLE 1

Tensile strengths of the four paper specimens

| additive | amount (% by weight) | tensile strength (MPa) |
| --- | --- | --- |
| none | — | 1.3 |
| polyvinylamine | 17 | 0.8 |
| oxidised starch | 25 | 2.1 |
| polyvinylamine + oxidised starch | 12 + 20 | 5.3 |

This table shows that the addition of polyvinylamine alone reduces the tensile strength of the paper, whereas the addition of oxidised starch increases the tensile strength almost by a factor of two. The addition of both polyvinylamine and the oxidised starch increases the tensile strength by a factor of four. It must be noticed that a large part of the polyvinylamine in the second sample was pressed out of the paper. In the fourth sample, the polyvinylamine was fixed in the paper by the oxidised starch.

Example 10

Adhesive

Example 10

Adhesion Strength to Wood and Paper

Modified starch as described in example 1 is used to connect two pieces of wood. The tensile strength of the adhesive layer was ca. 6 MPa. The composition as described in example 3 was also used to connect two pieces of wood. In this case the tensile strength of the adhesive was increased to ca. 8 MPa. Two pieces of paper that are connected using the starch-polyvinylamine composition of example 3 are tested using a T-peel test according to NEN-EN 1895 in dry and wet conditions. In both cases, the paper tears instead of the adhesive layer.

The invention claimed is:

1. A composition comprising an aqueous solution of 0.1-20 wt. % of a poly(amine) and 0.1 to 50 wt. % of a carboxylated carbohydrate having an average molecular weight of at least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine).

2. A composition according to claim 1, wherein at least part of the carboxyl groups present in the carboxylated carbohydrate are obtained by carboxyalkylation of the original carbohydrate.

3. A composition according to claim 1, wherein the carboxylated carbohydrate has a degree of aldehyde substitution in the range of from 0.1 to 20%.

4. A composition according to claim 1, wherein the poly(amine) comprises polyvinylamine.

5. A composition according to claim 1, wherein the carboxylated carbohydrate comprises an α-1,3/1, 6- or α-1, 4/1, 6-glucan.

6. A composition according to claim 1, wherein the carboxylated carbohydrate comprises a starch.

7. A composition according to claim 1, wherein the carboxylated carbohydrate comprises at least 20% of the reducing agent used in the reduction treatment.

8. A composition according to claim 1, wherein the reducing agent comprises a borohydride.

9. A composition according to claim 1, wherein the carboxylated carbohydrate comprises carbonyl and/or aldehyde groups, which are obtained by oxidation of primary hydroxyl groups.

10. A composition claim 1, wherein the carboxylated carbohydrate comprises carboxyl and/or aldehyde groups, which are obtained by oxidation of secondary hydroxyl groups.

11. A composition according to claim 1, wherein the carboxylated carbohydrate is chemically crosslinked.

12. A composition according to claim 11, wherein the carboxylated carbohydrate is crosslinked with a dihydrazide.

13. A method of preparing a fibrous product, film, coating, foil or capsule comprising forming an aqueous solution of 0.1-20 wt. % of a poly(amine) and 0.1 to 50 wt. % of a carboxylated carbohydrate having an average molecular weight of at least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine) into a fibrous product, film, coating, foil or capsule.

14. A method for preparing fibres comprising forming into fibers an aqueous solution of 0.1-20 wt. % a carboxylated carbohydrate having an average molecular weight of at least 100,000 D and a degree of carboxyl substitution of at least 5%, of which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine), a poly(amine) and a carboxylated carbohydrate having an average molecular weight of at least 100,000 D and a degree of carboxyl substitution of at least 5%.

15. Fibres made from the composition according to claim 1.

16. A composition comprising fibres according to claim 15.

17. A method of preparing a composition which comprises forming fibres made from an aqueous solution of 0.1-20 wt. % of a poly(amine) and 0.1 to 50 wt. % of a carboxylated carbohydrate having an average molecular weight of at least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine) into a composition.

18. Paper product comprising fibres according to claim 15.

19. A method of preparing a paper product which comprises forming fibres made from an aqueous solution of 0.1-20 wt. % of a poly(amine) and 0.1 to 50wt. % of a carboxylated carbohydrate having an average molecular weight of at least 100,000 D and a degree of carboxyl substitution of at least 5%, which carboxylated carbohydrate has been obtained by subjecting a corresponding original carbohydrate to an oxidation treatment whereby carboxyl and aldehyde groups are obtained by oxidation of hydroxyl groups of the original carbohydrate, after which the oxidised carbohydrate so obtained is contacted with a reducing agent whereby at least part of the aldehyde groups that were obtained in the oxidation treatment are reduced to hydroxymethyl groups, whereby the carboxylated carbohydrate comprises at least part of the reducing agent and/or its reaction product(s), and wherein the carboxylated carbohydrate forms a complex with the poly(amine) into a paper product.

* * * * *